United States Patent
Pereira et al.

(10) Patent No.: US 8,826,431 B2
(45) Date of Patent: Sep. 2, 2014

(54) USING TELEMETRY TO REDUCE MALWARE DEFINITION PACKAGE SIZE

(71) Applicant: Symantec Corporation, Mountain View, CA (US)

(72) Inventors: Shane Pereira, Los Angeles, CA (US); Carey S. Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/682,288

(22) Filed: Nov. 20, 2012

(65) Prior Publication Data

US 2014/0143869 A1    May 22, 2014

(51) Int. Cl.
  *G06F 21/00* (2013.01)
  *G06F 21/56* (2013.01)
  *H04L 29/06* (2006.01)

(52) U.S. Cl.
  CPC ............. *G06F 21/566* (2013.01); *H04L 63/14* (2013.01)
  USPC ................................ 726/22; 726/24; 713/188

(58) Field of Classification Search
  None
  See application file for complete search history.

(56) References Cited

U.S. PATENT DOCUMENTS

| | | | |
|---|---|---|---|
| 2003/0120951 A1* | 6/2003 | Gartside et al. | 713/201 |
| 2008/0086773 A1* | 4/2008 | Tuvell et al. | 726/23 |
| 2008/0086776 A1* | 4/2008 | Tuvell et al. | 726/24 |
| 2009/0293125 A1* | 11/2009 | Szor | 726/24 |
| 2010/0242094 A1* | 9/2010 | Hussain et al. | 726/4 |
| 2011/0047594 A1 | 2/2011 | Mahaffey et al. | |
| 2011/0173677 A1* | 7/2011 | Tarbotton et al. | 726/3 |

FOREIGN PATENT DOCUMENTS

EP    2506179 A2    10/2012

OTHER PUBLICATIONS

PCT International Search Report and Written Opinion, PCT Application No. PCT/US2013/070137, Jan. 30, 2014, 8 pages.

* cited by examiner

*Primary Examiner* — Jeffrey Williams
(74) *Attorney, Agent, or Firm* — Fenwick & West LLP (57) ABSTRACT

Clients send telemetry data to a cloud server, where the telemetry data includes security-related information such as file creations, timestamps and malware detected at the clients. The cloud server analyzes the telemetry data to identify malware that is currently spreading among the clients. Based on the analysis of the telemetry data, the cloud server segments malware definitions in a cloud definition database into a set of local malware definitions and a set of cloud malware definitions. The cloud server provides the set of local malware definitions to the clients as a local malware definition update, and replies to cloud definition lookup requests from clients with an indication of whether a file identified in a request contains malware. If the file is malicious, the client remediates the malware using local malware definition update.

17 Claims, 6 Drawing Sheets

USING TELEMETRY TO REDUCE MALWARE DEFINITION PACKAGE SIZE

BACKGROUND

1. Field of the Invention

This invention pertains in general to computer security and in particular to reducing the size of definition packages used to detect malicious software.

2. Description of the Related Art

Users of modern electronic devices face a wide variety of threats. For example, innocent-looking websites can surreptitiously hide malicious software (malware) such as computer viruses, worms, Trojan horse programs, spyware, adware, and crimeware in files downloaded from the websites. The malware can capture important information such as logins, passwords, bank account identifiers, and credit card numbers. Similarly, malware can provide hidden interfaces that allow the attacker to access and control the compromised device, or that cause the compromised device to malfunction.

Security software protects electronic devices by detecting and remediating malware. One way to detect malware is through the use of malware definitions. A malware definition describes characteristics of particular type of known malware. Typically, malware definitions are generated by the provider of the security software and are deployed to the electronic device. The security software on the electronic device uses the deployed malware definitions to scan the device for malware.

The security software provider must deploy many malware definitions to the electronic devices in order to provide protection against the many different malware threats. Deploying the malware definitions to a large number of electronic devices consumes a significant amount of computing resources. For example, deploying the malware definitions consumes a significant amount of network bandwidth. In addition, the malware definitions consume a large amount of memory on the electronic devices.

SUMMARY

The above and other needs are met by methods, computer-readable storage media, and systems for effectively reducing the number of antivirus definitions stored at a client while maintaining computer security of the client.

One aspect provides a computer-implemented method for providing malicious software (malware) definitions to clients. The method receives telemetry data from multiple clients, where the telemetry data describes files created on the clients. The method analyzes the telemetry data to identify malware that is currently spreading among the clients. Responsive to the analysis of the telemetry data, the method segments a set of malware definitions in a cloud database into a set of local malware definitions and a set of cloud malware definitions. The set of local malware definitions include malware definitions for malware identified as currently spreading among the clients. The method provides the set of local malware definitions to the clients, where the clients are adapted to store the local malware definitions and use the set of local malware definitions to detect malware at the clients.

Another aspect provides a non-transitory computer-readable storage medium storing executable computer program instructions for providing malware definitions to clients. The computer-readable storage medium stores computer program instructions for receiving telemetry data from multiple clients and for analyzing the telemetry data to identify malware that is currently spreading among the clients. The telemetry data describes files created on the clients. Responsive to the analysis of the telemetry data, a set of malware definitions in a cloud database is segmented into a set of local malware definitions and a set of cloud malware definitions. The set of local malware definitions include malware definitions for malware identified as currently spreading among the clients. The computer-readable storage medium further stores computer program instructions for providing the set of local malware definitions to the clients, where the clients are adapted to store the local malware definitions and use the set of local malware definitions to detect malware at the clients.

Still another aspect provides a computer system for providing malware definitions to clients. The system includes a server communication module for receiving telemetry data from multiple clients, where the telemetry data describes files created on the clients. The system also includes an analysis module for analyzing the telemetry data to identify malware that is currently spreading among the clients. Responsive to the analysis of the telemetry data, a segmentation module of the system is configured to segment a set of malware definitions in a cloud database into a set of local malware definitions and a set of cloud malware definitions. The set of local malware definitions include malware definitions for malware identified as currently spreading among the clients. The server communications module is configured to provide the set of local malware definitions to the clients, where the clients are adapted to store the local malware definitions and use the set of local malware definitions to detect malware at the clients.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
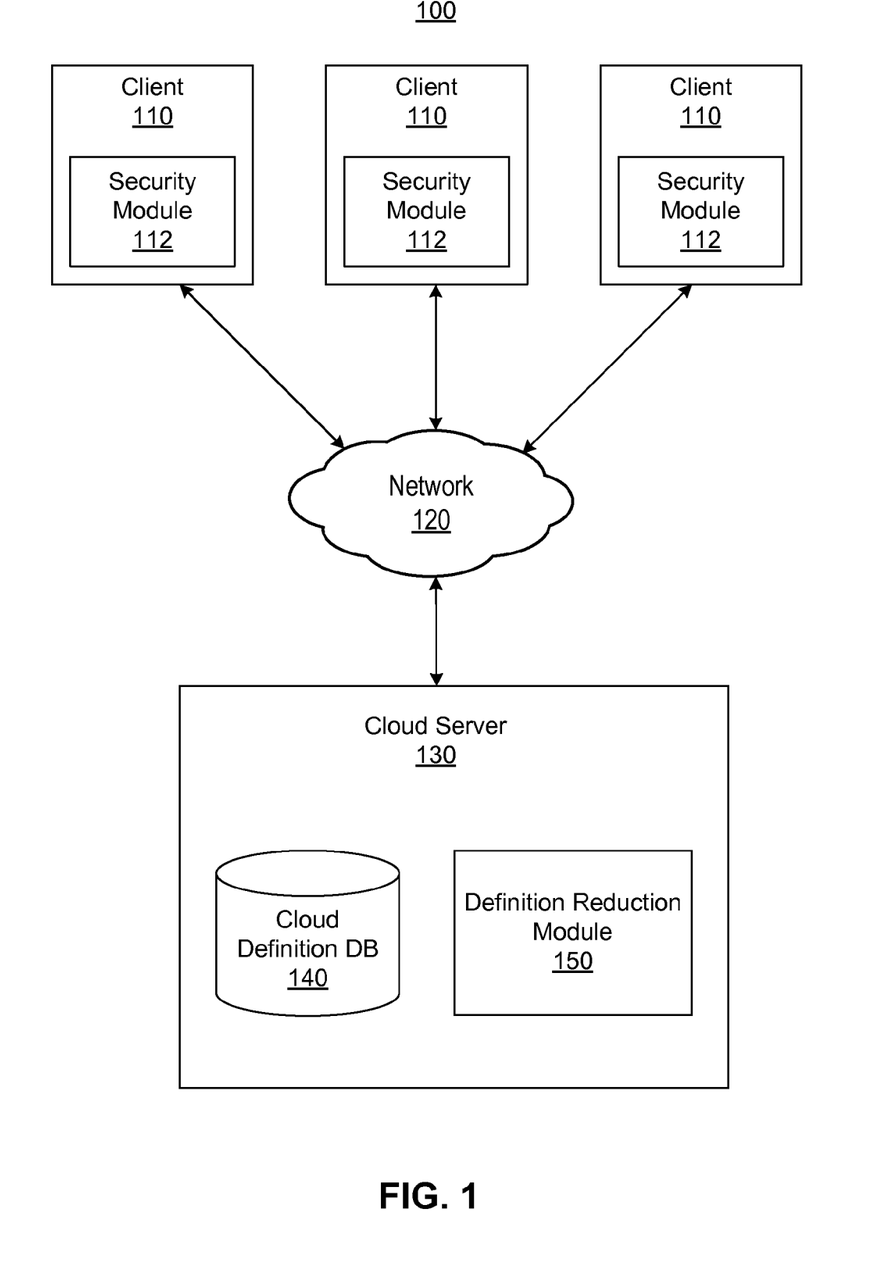
FIG. 1 is a high-level block diagram of a computing environment for reducing the size of malicious software (malware) definition packages according to one embodiment.

FIG. 1 is a high-level block diagram of a computing environment 100 for reducing the size of malicious software (malware) definition packages according to one embodiment. FIG. 1 illustrates a cloud server 130 and three clients 110 connected by a network 120. The illustrated environment 100 represents a typical computing environment where the cloud server 130 provides computer security to a set of clients 110. Only three clients 110 and one cloud server 130 are shown in FIG. 1 in order to simplify and clarify the description. Embodiments of the computing environment 100 can have many clients 110 and cloud servers 130 connected to the network 120. The multiple cloud servers 130 may communicate with each other and correlate data (e.g., telemetry data reports) received from the clients 110 in order to get a comprehensive view of the telemetry coming from the clients 110.

A client 110 is an electronic device used by a user to perform functions such as executing software applications, browsing websites hosted by web servers on the network 120, downloading files, and interacting with the cloud server 130, and/or other entities on the network. In one embodiment, the client 110 is a personal computer (PC) such as a desktop, notebook, or tablet computer. In other embodiments, the client 110 is a mobile telephone, personal digital assistant, television set-top box, or other electronic device.

The client 110 executes a security module 112 for protecting the client from malware and other threats. Depending upon the embodiment, the security module 112 may be a standalone application or integrated into the operating system or other software executing on the client 110. In addition, the security module 112 may be located apart from the client 110, such as within a proxy server that monitors network communications involving the client.

In one embodiment, the security module 112 detects and remediates any malware present on the client 110. To this end, the security module 112 maintains a local set of malware definitions. The local set of malware definitions is stored at or in close proximity to the client 110 and updated with new definitions received from the cloud server 130. For example, the local malware definitions may be uploaded on a periodic and/or asynchronous schedule.

The security module 112 also monitors actions performed by software executing on the client 110. For example, the monitored actions may include file accesses such as executing a file, creating a new file, and downloading a file. If a file is accessed, the security module 112 analyzes the file using the local set of malware definitions to determine if the file contains malware. If the file is malicious, the security module 112 remediates the file by, e.g., preventing execution of the file and removing it from the client 110.

If an accessed file is not found in the local set of malware definitions, an embodiment of the security module 112 sends a cloud definition lookup request for the file to the cloud server 130. This request includes a description of the file, such as a hash, that the cloud server 130 can use to determine whether the file is malicious. The security module 112 receives a reply to the request from the cloud server 130 and remediates the file if the reply indicates that the file is malicious. The security module 112 may also send cloud definition lookup requests to the cloud server 130 at other times. For example, the security module 112 may perform periodic scans of files on the client 110 during which it sends cloud definition lookup requests for multiple client files to the cloud server 130.

In addition, the security module 112 sends telemetry data reports to the cloud server 130. A telemetry data report includes telemetry data describing security-related activities observed and/or performed by the security module 112. For example, a telemetry report may describe file access activities such as newly-created files detected on the client. In addition, a telemetry report may describe malware detected on the client 110.

The cloud server 130 interacts with the security modules 112 of the clients 110 via the network 120 to provide security to the clients. In one embodiment the cloud server 130 is operated by the same security provider that provides the security modules 112 to the clients. The cloud server 130 includes one or more computers executing modules for providing the functionality described herein. In one embodiment, the functions of the cloud server 130 are provided by a cloud computing environment. As used herein, "cloud computing" refers to a style of computing in which dynamically scalable and often virtualized resources are provided as a service over the network 120. Different functions ascribed to the cloud server 130 herein may be performed by different physical servers. Functions attributed to the clients 110 can also be provided by the cloud computing environment.

The cloud server 130 includes a cloud definition database 140. This database 140 stores definitions for known malware. In one embodiment, the cloud definition database 140 is substantially complete and stores definitions for all malware known to the security provider. The definitions are created by security analysts using automated and/or manual techniques.

The cloud server 130 receives cloud definition lookup request from the security modules 112 of the clients 110. Upon receipt of such a request, the cloud server 130 uses the malware definitions in the cloud definition database 140 to determine whether the file described in the request is malicious. The cloud server 130 sends the result of the determination to the requesting security module 112.

Further, an embodiment of the cloud server includes a definition reduction module 150. This module 150 uses the telemetry data in the cloud definition lookup request and the telemetry data reports received from the client security modules 112 to identify a subset of the malware definitions stored in the cloud definition database 140 to store locally at the clients 110. Thus, the definition reduction module 150 segments the malware definitions into a set of cloud definitions maintained only in the cloud definition database 140 of the cloud server 130 and into a set of local definitions that are also stored locally at the clients 110. The definition reduction module 150 provides the malware definitions in the local set to the security modules 112 of the clients 110.

In one embodiment, the definition reduction module 150 uses the telemetry data reports to identify the types of malware that are currently actively spreading among the client population. Malware definitions for these types of malware are segmented into the set of local definitions sent to the clients 110. The segmentation of the definitions can change over time as new malware appears and old malware fades away. An embodiment of the definition reduction module 150 sends local malware definition updates to the clients 110 as old definitions are removed and new definitions are added to the local set.

In this manner, the client security modules 112 can use the local definitions to quickly detect and block the malware most likely to be detected at the clients 110, even when a network 120 connection is not present or unreliable. Furthermore, the size of the local definition set tends to be much smaller than the cloud definition set, thereby reducing the amount of data that must be sent and maintained by the client 110 to provide security.

The network 120 enables communications among the clients 110 and the cloud server 130 and can comprise the Internet as well as mobile telephone networks. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
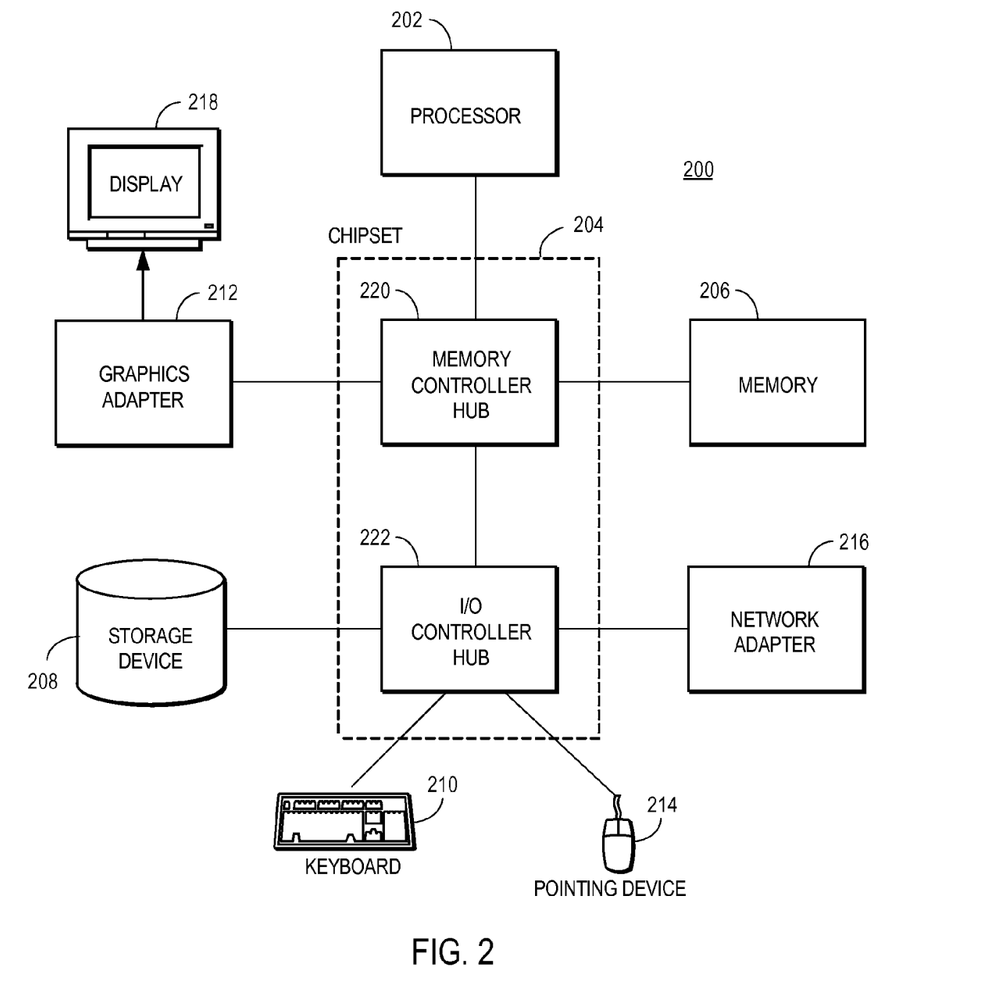
FIG. 2 is a high-level block diagram of a computer for acting as a client and/or cloud server in one embodiment.

FIG. 2 is a high-level block diagram of a computer 200 for acting as a client 110 and/or cloud server 130 in one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a cloud server 130 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
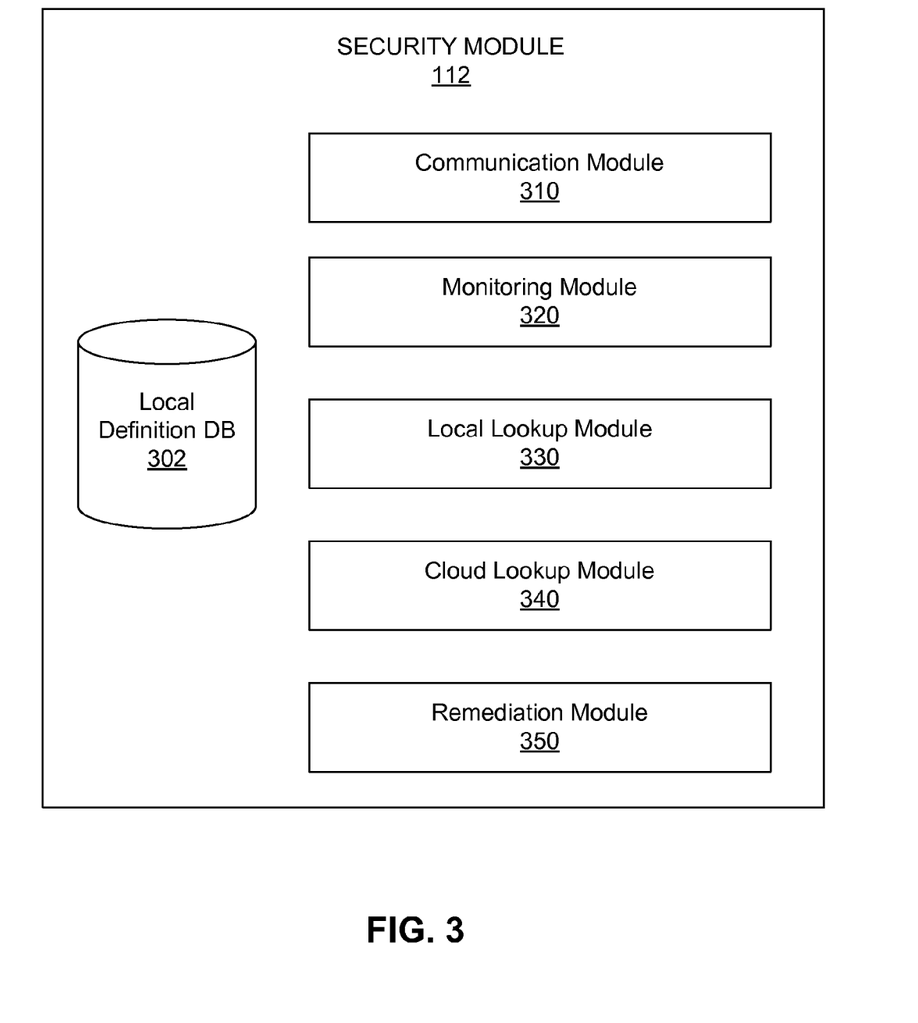
FIG. 3 is a high-level block diagram illustrating a detailed view of the security module of a client according to one embodiment.

FIG. 3 is a high-level block diagram illustrating a detailed view of the security module 112 of a client 110 according to one embodiment. As shown in FIG. 3, the security module 112 includes a communication module 310, a monitoring module 320, a local lookup module 330, a cloud lookup module 340 and a remediation module 350. The security module 112 also includes a local definition database 302 storing the local set of malware definitions. Those of skill in the art will recognize that other embodiments of the security module 112 can have different and/or other modules than the ones described here, and that the functionalities can be distributed among the modules in a different manner.

The communication module 310 communicates with the cloud server 130 by sending cloud definition lookup requests to the cloud server and receiving replies to the requests from the cloud server. In one embodiment, the communication module 310 sends the requests in response to instructions from the cloud lookup module 330 and/or other modules within the security module 112. Likewise, the communication module 310 provides the replies to the requests to the cloud lookup module 340 and/or other modules within the security module 112. The communication module 310 also sends telemetry data reports to the cloud server 130 in response to instructions from the monitoring module 320 and/or other modules within the security module 112. Further, an embodiment of the communication module 310 receives local malware definition updates from the cloud server 130 and updates the local definition database 302 accordingly.

The monitoring module 320 monitors security-related aspects of activities performed on the client. In one embodiment, the monitoring module 320 monitors file-system events in real time. This monitoring detects file accesses such as files being created. The monitoring module 320 may temporarily suspend the execution of a file so that it can be analyzed for malware detection. For example, upon detecting the creation of a new file, the monitoring module 320 may temporarily prevent the file from being executed so that it can be checked for the presence of malware. The monitoring module 320 may also monitor behaviors of executing processes to identify any suspicious behaviors. If a process behaves suspiciously, the monitoring module 320 may suspend execution of the process so that the corresponding file can be checked for malware. The monitoring module 320 may resume execution of the file if the file is subsequently not found to contain malware.

In addition, an embodiment of the monitoring module 320 collects telemetry data describing the monitored activities. As mentioned above, the telemetry data may describe malware and newly-created files detected on the client 110. For detected malware, the telemetry data may include a reference to the specific type of detected malware and/or to the malware definition that triggered the malware detection. For newly-created files, the telemetry data may also include further details associated with the new files, such as the locations of the files within a storage device of the client 110, the universal resource locators (URLs) from which files were downloaded, an identity of an installer or other component within a file, strings within executable components within the file, components installed on the client by the file, system settings and configuration changes made by the file, a hash or other identifier of the file, and version numbers and application language settings associated with the file. In addition, the telemetry data may include timestamps and other timing information indicating when a file was accessed and when malware was detected. The telemetry data may also include a client identifier that uniquely identifies the client 110.

The monitoring module 320 includes the telemetry data in telemetry data reports that the communication module 310 sends to the cloud server 130. The monitoring module 320 may submit telemetry data reports at various times in different embodiments. For example, the monitoring module 320 may submit telemetry data reports each time a specified event occurs (e.g., upon detection of a new file or malware), on a periodic basis (e.g., every hour), or in response to meeting a threshold (e.g., after the creation of 100 new files is detected).

The local lookup module 330 uses the local malware definitions stored in the local definition database 302 to determine whether files detected by the monitoring module 320 are malicious (i.e., contain malware). In one embodiment, the local lookup module 330 uses a malware scanner to scan the detected files for any malware described by the local malware definitions. If the scan indicates that a file contains malware, the local lookup module 330 notifies the monitoring module 320 of the malware detection so that the detection may be included in a telemetry data report. In addition, an embodiment of the local lookup module 330 communicates with the remediation module 350 so the latter module may remediate the malware.

The cloud lookup module 340 sends cloud definition lookup requests to the cloud server 130 and receives replies in response thereto. In one embodiment, the cloud lookup module 340 sends a cloud definition lookup request to the cloud server 130 identifying a file detected by the monitoring module 320 that is not determined to be malicious by the local lookup module 330. Thus, if the monitoring module 320 detects a new file, and the local lookup module 330 scans the new file using the local set of malware definitions but does not detect any malware, the cloud lookup module 340 then sends a cloud definition lookup request for the file to the cloud server 130.

A cloud definition lookup request identifies a file to the cloud server 130 using a variety of techniques. In one embodiment, the cloud definition lookup request includes a copy of the file that is being looked up. In another embodiment, the cloud definition lookup request includes a compact description of the file, such as a hash of the file, portions of data extracted from the file, and/or descriptions of portions of data contained within the file. The cloud definition lookup request may also include some or all of the same data included within the telemetry data reports for the file.

The reply from the cloud server 130 indicates whether the identified file contains malware, as determined using the cloud definitions maintained by the cloud server 130. If the reply indicates that a file contains malware, the cloud lookup module 340 notifies the monitoring module 320 of the malware detection so that the detection may be included in a telemetry data report. Alternatively, the cloud server 130 may treat the cloud definition lookup requests as a type of telemetry data report, so that a separate report is not necessary. Further, a reply from the cloud server 130 indicating that a file contains malware may include the malware definition for the detected malware. The cloud lookup module 340 stores this definition in the local definition database 302. An embodiment of the local lookup module 330 also communicates with the remediation module 350 so the latter module may remediate the malware using the malware definition.

If the reply from the cloud server 130 indicates that the identified file does not contain malware, the cloud lookup module 340 notifies the monitoring module 320 that the file was not identified as malicious. If no reply to a request is received from the cloud server 130 within a threshold amount of time, the cloud lookup module 340 may resend the request immediately or schedule the request for a later time. In the absence of a reply, the cloud lookup module 340 may treat the identified file in the request as malicious or not malicious, depending upon the embodiment.

The cloud lookup module 340 may also send cloud definition lookup requests independent of any activities detected by the monitoring module 320. In one embodiment, the cloud lookup module 340 periodically sends cloud look requests for all, or a subset, of the files stored on the client 110. For example, the cloud lookup module 340 may submit cloud definition lookup requests daily, weekly, or monthly for files stored at the client 110. These cloud lookup requests may be conducted in the background, so that the requests do not interfere with the normal operation of the client 110. If malware is detected through one of these requests, the cloud lookup module 340 communicates with the remediation module 350 to remediate the malware.

The remediation module 350 remediates (e.g., removes) malware detected on the client 110. In one embodiment, the remediation module 350 is notified by another module within the security module 112 when malware is detected on the client 110. This notification also indicates the type of malware. The remediation module 350 uses remediation information stored in the malware definition for the malware or elsewhere to remediate the malware. For example, the remediation module 350 may remove malicious content from within a file, delete a file containing malware, quarantine a file containing malware so that it cannot be executed, restore files and configuration settings on the client 110 that were affected by the malware, and/or perform other actions. The remediation module 350 may also generate an alert informing the user of the client 110 of the malware detection and ability to remediate it.

Figure 4:
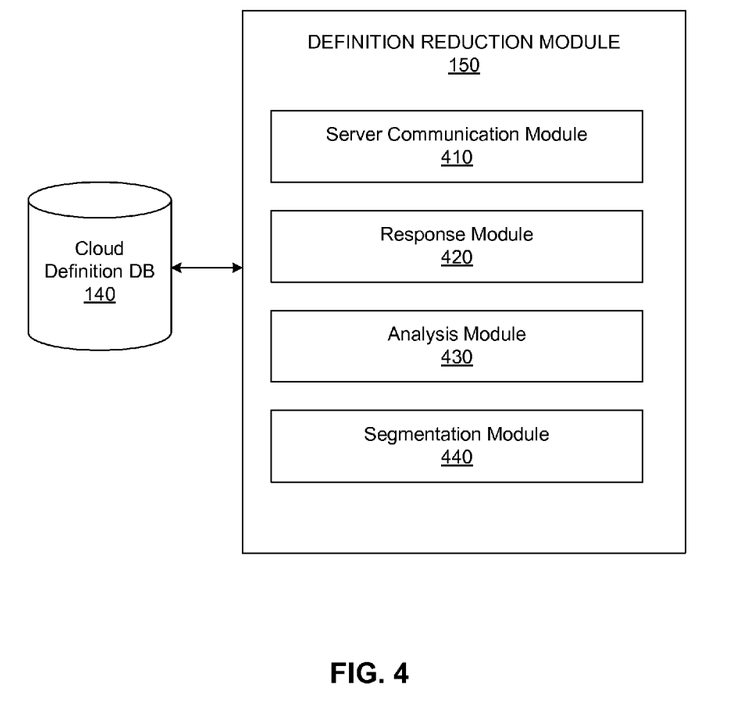
FIG. 4 is a high-level block diagram illustrating a detailed view of the definition reduction module of the cloud server according to one embodiment.

FIG. 4 is a high-level block diagram illustrating a detailed view of the definition reduction module 150 of the cloud server 130 according to one embodiment. As shown in FIG. 4, the definition reduction module 150 includes a server communication module 410, a response module 420, an analysis module 430, and a segmentation module 440. Those of skill in the art will recognize that other embodiments of the definition reduction module 150 can have different and/or other modules than the ones described here, and that the functionalities can be distributed among the modules in a different manner.

As discussed previously, the definition reduction module 150 uses malware definitions stored in the cloud definition database 140. The malware definitions describe characteristics of known malware. In one embodiment, each malware definition is associated with a specific type of known malware, and includes information that can be used to determine whether a particular file includes that type of malware. For example, the malware definition may include a hash value produced by applying a particular hash function to a file that contains the malware. Thus, a file can be checked for malware by applying the hash function to the file and determining whether the resulting hash value matches the hash specified in the malware definition. A malware definition may also include a data string (e.g., a byte string) that is unique to the malware and/or other data that can be used to distinguish the malware from other data.

The cloud definition database 140 may store additional data associated with the malware definitions. For example, the cloud definition database 140 may store some or all of the data from the telemetry data reports received by the cloud server 130. In one embodiment, the cloud definition database 140 stores the malware definitions in a table format, with a row for each type of malware and including columns for, e.g., the hash value or other information for detecting the malware, a timestamp indicating when the malware was last detected on a client 110, the number of clients on which the malware was detected, and remediation information for the malware.

The server communication module 410 communicates with the clients 110 by receiving cloud definition lookup requests from the clients and sending replies in response to the requests to the clients 110. The server communication module 410 sends the lookup requests to the other modules within the definition reduction module 150. Similarly, the server communication module 410 receives the replies to the lookup requests from the other modules within the definition reduction module 150 and sends the replies to the requesting clients 110. The server communication module 410 also receives telemetry data reports from the clients 110. In one embodiment, the server communication module 410 stores the telemetry data received in the reports, and telemetry data received in the cloud definition lookup requests, in the cloud definition database 140. The server communication module 410 may also send the telemetry data to other modules within the definition reduction module 150. Additionally, the server communication module 410 may send local malware definition updates to the clients 110.

The response module 420 generates replies to cloud definition lookup requests. In one embodiment, the response module 420 processes a cloud definition lookup request by identifying the file referenced in the request, and determining whether the identified file matches a definition in the cloud definition database 140. Thus, the response module 420 determines whether the characteristics of the identified file in the cloud definition lookup request matches the characteristics of any known malware described by the definitions in the cloud definition database 140. If there is a match, the response module 420 generates a reply to the cloud definition lookup request that identifies the file as malware and includes the associated malware definition so that the client 110 receiving the reply can remediate the malware. The response module 420 may also update the telemetry data in the cloud definition database 140 to include a timestamp indicating when the malware was detected. If there is no match, the response module 420 generates a reply to the cloud definition lookup request indicating that the file does not match any known malware.

The analysis module 430 analyzes telemetry data received from the clients 110 in the cloud definition lookup requests and telemetry data reports to identify a set of malware that is currently spreading in the wild (i.e., spreading among the clients 110). Malware that is currently spreading among the clients 110 represent the greatest threat because the malware may damage the clients 110 to which it spreads. At the same time, detecting the currently spreading malware represents the highest priority because early detection of the malware can stop its spread and minimize any damage.

To identify actively-spreading malware, the analysis module 430 analyzes the telemetry data received from the clients 110. To this end, one embodiment of the analysis module 430 examines the telemetry data in the cloud definition database 140 on a periodic basis, such as daily. The analysis module 430 uses the telemetry data to determine which malware has been detected on the clients within a predetermined prior time period. For example, the analysis module 430 may use the telemetry data to determine which types of malware were detected on the clients 110 within the last week, month, six months, or year. The analysis module 430 may also determine how often the particular types of malware were detected. The analysis module 430 may identify malware that is detected on more than a threshold number of clients 110 within the time period as actively-spreading.

In addition, the analysis module 430 may use a variety of other criteria to determine whether given malware is considered to be actively spreading. For example, the analysis module 430 may adjust the time period in which malware is considered "actively spreading" based on the amount of damage caused by the malware. Thus, malware that causes great damage might be considered "actively" spreading if it is detected on only a few clients 110 within the last 12 months, while malware that causes relatively little damage might be considered "actively" spreading only if it is detected on a relatively large number of clients within the last three months.

Additionally, the analysis module 430 may consider the size of a malware definition (i.e., the amount of storage space consumed by the definition) when determining whether the associated malware is actively spreading. Generally, the larger the malware definition, the more and/or more recent detections of the associated malware required by the analysis module 430 in order to consider the malware active. If the malware definition for given malware is relatively small, the analysis module 430 may consider the malware to be actively spreading even if there have been relatively few detections and/or the detections were made a relatively long time ago. This handling of small definitions is possible due to the relatively small cost of including the definitions within the local sets of malware definitions at the clients.

The segmentation module 440 segments the malware definitions in the cloud definition database 140 into a set of local malware definitions and a set of cloud malware definitions based on the analysis performed by the analysis module 430. The segmentation module 440 provides the set of local malware definitions to the server communication module 410 for sending to the clients as local malware definition updates. The local malware definitions are also stored in the cloud definition database 140. The set of cloud malware definitions are stored only in the cloud definition database 140.

In one embodiment, the segmentation module 440 segments malware definitions for malware that is currently actively spreading among the clients 110 into the set of local malware definitions. To this end, the segmentation module 440 obtains the identities of the malware in the set of actively spreading malware from the analysis module 430. The segmentation module 440 obtains the malware definitions for the actively spreading malware from the cloud definition database 140, and provides these malware definitions to the clients 110 in a local malware definition update.

The segmentation module 440 may update the set of local malware definitions on a periodic basis, such as daily, weekly, or monthly. The segmentation module 440 may also update the set of local malware definitions at other times, such as when a new malware definition is added to the cloud definition database 140. During such an update, the segmentation module 440 may remove malware definitions from the set of local malware definitions if the corresponding malware is no longer considered to be actively spreading by the analysis module 430. Likewise, the segmentation module 440 may add malware definitions to the set of local malware definitions if the corresponding malware is considered to be actively spreading at the time of the update.

Figure 5:
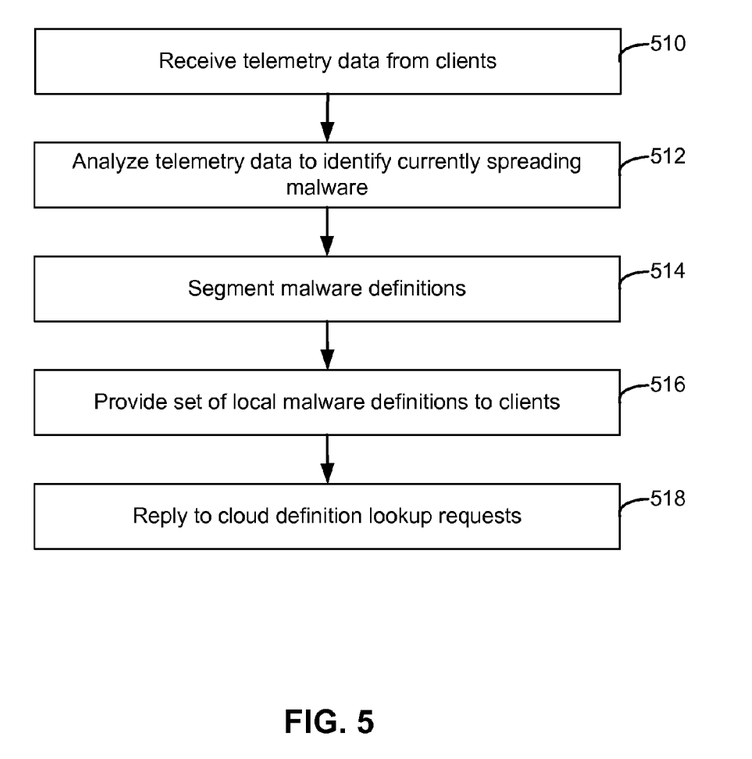
FIG. 5 is a flowchart illustrating steps performed by the cloud server according to one embodiment.

FIG. 5 is a flowchart illustrating steps performed by the cloud server 130 according to one embodiment. Other embodiments perform the illustrated steps in different orders, and/or perform different or additional steps. Moreover, some of the steps may be performed by entities other than the cloud server 130.

The cloud server 130 receives 510 telemetry data from the clients 110. The telemetry data includes data received in cloud definition lookup requests and in telemetry data reports. The telemetry data may describe, for example, file accesses such as new files created at the clients 110 and malware detected at the clients. The telemetry data may also include other security-related information, such as timestamps of when a new file was detected, where the file was stored at the client 110, and from where the file was downloaded. The cloud server 130 may receive telemetry data from many different clients 110.

The cloud server 130 analyzes 512 the telemetry data to identify malware that is currently spreading among the clients 110. Based on this analysis, the cloud server 130 segments 514 malware definitions in the cloud definition database 140 into a set of local malware definitions and a set of cloud malware definitions. In one embodiment, the cloud server 130 segments malware definitions for malware that is currently spreading into the set of local malware definitions. The set of local malware definitions is a subset of the set of cloud malware definitions. As part of the segmentation 514, the cloud server 130 may remove definitions for malware that is no longer actively spreading from the set of local malware definitions. The cloud server 130 provides 516 the set of local malware definitions to the clients 110 as a local malware definition update. In addition, the cloud server 130 replies 518 to cloud definition lookup requests with an indication of whether a file identified in the request contains malware.

Figure 6:
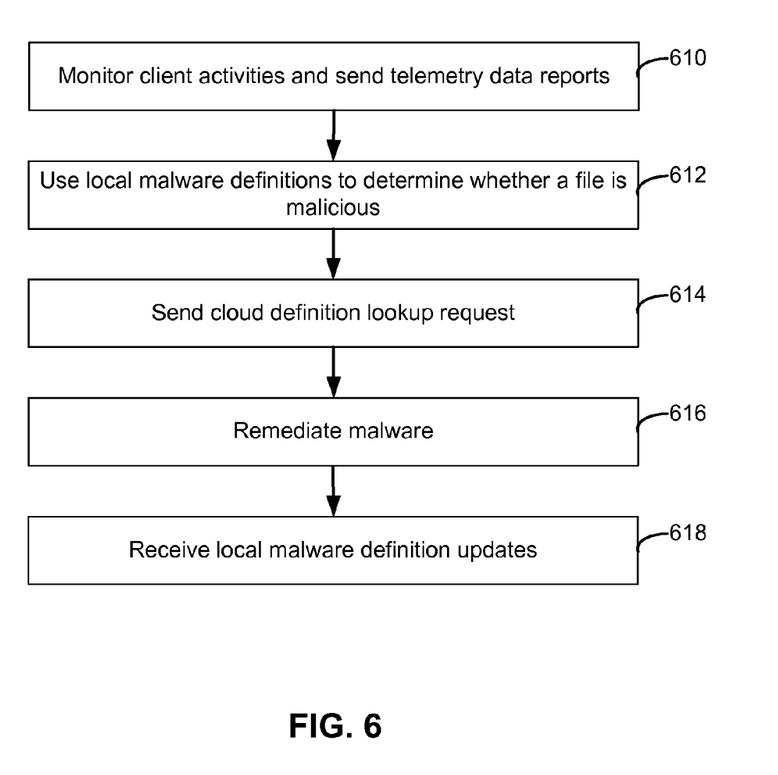
FIG. 6 is a flowchart illustrating steps performed by a client according to one embodiment.

FIG. 6 is a flowchart illustrating steps performed by a client 110 according to one embodiment. Other embodiments perform the illustrated steps in different orders, and/or perform different or additional steps. Moreover, some of the steps may be performed by entities other than the client 110.

The client 110 monitors 610 security-related aspects of activities, such as file accesses, performed at the client. The client 110 sends 610 telemetry data reports to the cloud server 130 describing the monitored activities. If the client 110 detects a file being created or otherwise accessed, the client uses local malware definitions stored in the local definition database 302 to determine whether the file is malicious. If the local malware definitions do not indicate that the file is malicious, the client 110 sends 614 a cloud definition lookup request to the cloud server 130, and receive a reply from the cloud server indicating whether a check of the cloud definition database 140 identified the file as malicious. If the file is malicious, the client 110 remediates the malware. In addition, the client 110 receives 618 local malware definition updates from the cloud server 130. The client 110 may also perform cloud definition lookup requests at other times.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of providing malicious software (malware) definitions to clients, comprising:
receiving, at a computer processor, telemetry data from a plurality of clients, the telemetry data describing files created on the clients;
analyzing, by the computer processor, the telemetry data to identify malware that is currently spreading among the plurality of clients, the analyzing comprising:
determining a size of a malware definition in a set of malware definitions; and
considering the size of the malware definition in a determination of whether malware associated with the malware definition is currently spreading;
segmenting, by the computer processor, the set of malware definitions into a set of local malware definitions responsive to the analysis of the telemetry data, the set of local malware definitions including malware definitions for malware identified as currently spreading among the plurality of clients; and
providing, by the computer processor, the set of local malware definitions to the plurality of clients, wherein the plurality of clients are adapted to store the local malware definitions and use the set of local malware definitions to detect malware at the clients.

2. The method of claim 1, wherein receiving telemetry data from the plurality of clients comprises:
determining whether a file created on a client of the plurality of clients matches a malware definition in the set of malware definitions; and
replying to a cloud definition lookup request from the client indicating whether the created file matches a malware definition in the set of malware definitions.

3. The method of claim 2, further comprising:
responsive to determining that the created file matches a malware definition, providing the matching malware definition to the client;
wherein the client is adapted to use the malware definition to remediate malware contained in the created file.

4. The method of claim 1, wherein analyzing the telemetry data comprises:
determining that malware detected on a threshold number of clients of the plurality of clients within a predetermined time period is currently spreading among the plurality of clients.

5. The method of claim 1, wherein segmenting the set of malware definitions into the set of local malware definitions responsive to the analysis of the telemetry data comprises:
maintaining a cloud definition database storing a set of cloud malware definitions;
identifying a subset of the cloud malware definitions responsive to the analysis of the telemetry data; and
providing the identified subset of the cloud malware definitions to the plurality of clients as the set of local malware definitions.

6. The method of claim 5, wherein segmenting the set of malware definitions further comprises:
removing a malware definition from the set of local malware definitions responsive to a determination that malware corresponding to the malware definition is not currently spreading among the plurality of clients.

7. A non-transitory computer-readable storage medium storing executable computer program instructions for providing malicious software (malware) definitions to clients, the computer program instructions comprising instructions for:
receiving telemetry data from a plurality of clients, the telemetry data describing files created on the clients;
analyzing the telemetry data to identify malware that is currently spreading among the plurality of clients, the analyzing comprising:
determining a size of a malware definition in a set of malware definitions; and
considering the size of the malware definition in a determination of whether malware associated with the malware definition is currently spreading;
segmenting the set of malware definitions into a set of local malware definitions responsive to the analysis of the telemetry data, the set of local malware definitions including malware definitions for malware identified as currently spreading among the plurality of clients; and
providing the set of local malware definitions to the plurality of clients, wherein the plurality of clients are adapted to store the local malware definitions and use the set of local malware definitions to detect malware at the clients.

8. The computer-readable storage medium of claim 7, wherein the computer program instructions for receiving telemetry data from the plurality of clients comprise instructions for:
determining whether a file created on a client of the plurality of clients matches a malware definition in the set of malware definitions; and replying to a cloud definition lookup request from the client indicating whether the created file matches a malware definition in the set of malware definitions.

9. The computer-readable storage medium of claim 8, further comprising computer program instructions for:
responsive to determining that the created file matches a malware definition, providing the matching malware definition to the client;
wherein the client is adapted to use the malware definition to remediate malware contained in the created file.

10. The computer-readable storage medium of claim 7, wherein the computer program instructions for analyzing the telemetry data comprise instructions for:
determining that malware detected on a threshold number of clients of the plurality of clients within a predetermined time period is currently spreading among the plurality of clients.

11. The computer-readable storage medium of claim 7, wherein the computer program instructions for segmenting the set of malware definitions into the set of local malware definitions responsive to the analysis of the telemetry data comprise instructions for:
maintaining a cloud definition database storing a set of cloud malware definitions;
identifying a subset of the cloud malware definitions responsive to the analysis of the telemetry data; and
providing the identified subset of the cloud malware definitions to the plurality of clients as the set of local malware definitions.

12. The computer-readable storage medium of claim 11, wherein the computer program instructions for segmenting the set of malware definitions further comprise instructions for:
removing a malware definition from the set of local malware definitions responsive to a determination that malware corresponding to the malware definition is not currently spreading among the plurality of clients.

13. A system for providing malicious software (malware) definitions to clients, the system comprising:
a processor for executing computer program code; and
a non-transitory computer-readable storage medium storing executable computer program code, the computer program code comprising code for:
receiving telemetry data from a plurality of clients, the telemetry data describing files created on the clients;
analyzing the telemetry data to identify malware that is currently spreading among the plurality of clients, the analyzing comprising:
determining a size of a malware definition in a set of malware definitions; and
considering the size of the malware definition in a determination of whether malware associated with the malware definition is currently spreading;
segmenting the set of malware definitions into a set of local malware definitions responsive to the analysis of the telemetry data, the set of local malware definitions including malware definitions for malware identified as currently spreading among the plurality of clients; and
providing the set of local malware definitions to the plurality of clients, wherein the plurality of clients are adapted to store the local malware definitions and use the set of local malware definitions to detect malware at the clients.

14. The system of claim 13, wherein receiving telemetry data from the plurality of clients comprises:
determining whether a file created on a client of the plurality of clients matches a malware definition in the set of malware definitions; and
replying to a cloud definition lookup request from the client indicating whether the created file matches a malware definition in the set of malware definitions.

15. The system of claim 13, wherein analyzing the telemetry data comprises:
determining that malware detected on a threshold number of clients of the plurality of clients within a predetermined time period is currently spreading among the plurality of clients.

16. The system of claim 13, wherein segmenting the set of malware definitions into the set of local malware definitions responsive to the analysis of the telemetry data comprises:
maintaining a cloud definition database storing a set of cloud malware definitions;
identifying a subset of the cloud malware definitions responsive to the analysis of the telemetry data; and
providing the identified subset of the cloud malware definitions to the plurality of clients as the set of local malware definitions.

17. The system of claim 16, wherein segmenting the set of malware definitions further comprises:
removing a malware definition from the set of local malware definitions responsive to a determination that malware corresponding to the malware definition is not currently spreading among the plurality of clients.

* * * * *